(12) United States Patent
Hayslett

(10) Patent No.: US 6,376,949 B1
(45) Date of Patent: Apr. 23, 2002

(54) ELECTRIC MOTOR FLUID DRAINAGE INTERFACE

(76) Inventor: Richard R. Hayslett, 3701 Bounty Ct., Matthews, NC (US) 28104

(*) Notice: Subject to any disclaimer, the term of this patent is extended or adjusted under 35 U.S.C. 154(b) by 27 days.

(21) Appl. No.: 09/666,992

(22) Filed: Sep. 21, 2000

(51) Int. Cl.[7] ................................................. H02K 5/10
(52) U.S. Cl. ........................... 310/88; 310/157; 277/68; 417/424.1
(58) Field of Search ............................. 310/88, 89, 91, 310/52, 54, 62, 63; 277/67, 68, 69; 417/408, 423.15, 423.3, 424.1, 281

(56) References Cited

U.S. PATENT DOCUMENTS

| | | | | |
|---|---|---|---|---|
| 3,134,333 A | * | 5/1964 | Vielsen | 417/423.3 |
| 3,327,144 A | * | 6/1967 | Double | 310/87 |
| 3,407,739 A | * | 10/1968 | Myers | 417/423.14 |
| 3,736,548 A | * | 5/1973 | Double | 310/87 |
| 3,754,844 A | * | 8/1973 | Nusser et al. | 417/423.12 |
| 4,689,511 A | | 8/1987 | Baker et al. | 310/88 |
| 4,961,018 A | * | 10/1990 | Akhter | 310/87 |
| 4,992,690 A | | 2/1991 | Baker | 310/89 |
| 5,076,762 A | * | 12/1991 | Lykes et al. | 417/40 |
| 5,099,781 A | * | 3/1992 | Frank | 310/88 |

* cited by examiner

Primary Examiner—Tran Nguyen
(74) Attorney, Agent, or Firm—Dougherty & Clements LLP

(57) ABSTRACT

An interface for mating a vertically oriented electric motor underneath a gearbox or other motor driven, fluid containing apparatus which substantially isolates the motor rotor and driven shaft from the external environment while facilitating the removal of leaking oil or other fluid from the area between the motor endshield and gearbox housing to the to the outside of the apparatus in order to prevent accidental oil penetration into the motor housing, the invented interface having a base plate component and a flinger component, wherein the flinger projects escaping oil away from the rotor shaft of the attached electric motor, which oil then drains through exit ports to the outside of the invented interface, such interface being connectable between electric motors and motor driven equipment through use of standardized C-face connection means.

16 Claims, 2 Drawing Sheets

ELECTRIC MOTOR FLUID DRAINAGE INTERFACE

FIELD OF THE INVENTION

The present invention relates to a method and apparatus for a motor fluid drainage interface, and more particularly to apparatus and methods for production of an electric motor fluid drainage interface.

BACKGROUND OF THE INVENTION

Electric Motors are the prime movers for most industrial applications. In industry, most motors are used in conjunction with speed changing devices which change the speed or torque produced at the motor shaft to match the speed or torque required by the driven equipment such as pumps, fans, conveyors, etc.

One of the most common speed changing devices is a speed reducer, or gearbox, which consist of a set of gears encased by a housing and partially immersed in lubricating oil. Oil is necessary in order to reduce friction between the gears and to allow the bearings in the gearbox to function properly. The oil leakage from the gearbox housing is prevented by oil seals.

An electric motor may be connected to a gearbox in a variety of configurations, with the particular arrangement being dictated by the intended use of the motor and gearbox. The ultimate operating position of the motor could be horizontal, vertical-shaft down, or vertical-shaft up. The application requirements and space restrictions normally dictate which position is required. Most motor manufacturers and gearbox manufacturers do not recommend mounting the motor vertical-shaft up when the two components are put together, because such an arrangement increases the likelihood of oil escaping from the gearbox and entering the motor.

While oil is necessary for a gearbox to function properly, it is detrimental to electric motors. If oil is allowed to enter an electric motor, the oil may cause fouling within the motor, may cause the coils within the motor to short-circuit, and may pose an additional risk as a fire hazard. Oil seals, such as those in a gearbox eventually fail, some sooner than others. Some motors designed for high volume requirements have multiple seals on the motor shaft for added protection, but the risk of seal failure still exists.

Electric motors are often mounted to gearboxes by use of C-Face flanges. The term "C-Face" refers to a set of dimensions, promulgated by the National Electrical Manufacturers Association (NEMA), which are used to standardize the way in which electric motors are attached to motor driven equipment. On a C-Face compatible motor, the shaft end endbell of the motor is machined to specific dimensions with predetermined bolt holes, bolt circle, and pilot diameter, etc. Each item of C-Face compatible motor driven equipment has a machined flange (a C-Face flange) which accepts the dimensions of the motor, allowing the motor and the driven equipment to be mated and bolted together. The connection of C-Face compatible components is known as C-Face mounting.

The shaft of a motor connected to a gearbox with a C-Face flange is not open to the environment. Therefore, any oil leaking from a gearbox into the motor is not obvious to an observer until evidenced by failure of the motor.

Motor failure caused by oil intrusion often necessitates replacement of the motor at a cost of $100 to $2000 depending on the horsepower, design, and enclosure of the motor. Motor failure caused by oil intrusion also results in innumerable hours of down time and lost production, as well as the costs of gearbox damage caused by the undetected loss of lubricating oil.

A need, therefore, exists for an improved drainage interface which is capable of being placed between an electric motor and gearbox, particularly when the motor is vertical shaft-up oriented, which prevents oil escaping the gearbox from entering and causing damage to the electric motor, and which further transports oil outside of the motor/gearbox assembly to be observed as an indication that maintenance need be performed.

DESCRIPTION OF THE PRIOR ART

Applicant is aware of the following U.S. Patents concerning drainage interfaces for electric motors.

| U.S. Pat. No. | Inventor | Issue Date | Title |
| --- | --- | --- | --- |
| 4,689,511 | Baker, et al. | 08-25-1987 | DRAIN ASSEMBLY FOR AN ELECTRIC MOTOR |
| 4,992,690 | Baker | 02-12-1991 | COMBINATION MOTOR ENDSHIELD AND PUMP HOUSING |

Baker et al., U.S. Pat. No. 4,689,511 teaches a drain structure for a vertically mounted electric motor positioned below a liquid sump into which the rotor shaft of the motor can be connected including a drip pan through which the rotor shaft passes, the pan having peripheral side walls and drain means attached thereto and a liquid slinger above the pan adapted to sling liquid leakage in a radially outward direction below the pan side walls to be drained away from the motor. However, the '511 invention simply rests upon the endshield of the motor and does not facilitate the connection of the electric motor to other equipment. Specifically, the '511 invention does not provide standardized mounting means, nor mating means to aid in alignment of the motor shaft with the drain structure and other connected equipment.

Baker, U.S. Pat. No. 4,992,690 teaches an electric motor for use with a pump having a stator and rotor assembly. The rotor assembly includes a rotatable shaft and a rotor affixed to and rotatable with the shaft. The stator and rotor assemblies are intended for installation in an appliance. A cover forms an endshield for the motor, as well as a portion of the housing of a pump for the appliance. The cover is so constructed to align the shaft extending into the pump with operable portions of the pump. The motor discloses a drain for collecting and draining water away from the motor shaft. However, the disclosed motor is a self-contained unit for connection directly to a pump. The '690 motor, therefore, may not be used as an interface between a standardized motor and pump or gearbox assembly.

SUMMARY OF THE INVENTION

The invention provides an apparatus for mating a vertically oriented electric motor underneath a gearbox or other motor driven apparatus which substantially isolates the motor rotor and driven shaft from the external environment while facilitating the removal of leaking oil or other fluid from the area between the motor endshield and gearbox housing. The invented interface, in use, resides between a vertically oriented electric motor and a gearbox or other motor driven device containing oil or other fluid.

The apparatus consists of two main parts, a base plate and a flinger. The substantially flat, circular base plate has an aperture through its center. The base plate defines oil exit ports, which are small diameter ports that extend through the body of the base plate, from the top of the base plate near the outer diameter of the aperture, to the outside edge of the base plate. The base plate also has a raised portion on its upper surface and a recess on its lower surface to provide for connection and alignment of the interface with the motor and gearbox.

The flinger is a ring shaped object having an inner diameter corresponding to the outer diameter of the electric motor rotor shaft.

When attached between an electric motor and a piece of motor driven equipment, the base plate rests upon and is attached to the endshield of the vertically oriented electric motor. The base plate is positioned so that the aperture of the base plate is coaxial with the motor rotor shaft, with the rotor shaft protruding upwards through the aperture. The recess in the lower surface of the base plate, and a series of bolt receiving holes around the periphery of the base plate intimately mate and attach to the endshield, preferably by means of a C-Face flange type connection.

The flinger is positioned around the portion of the rotor shaft which extends through the body of the base plate. The flinger is positioned along the rotor shaft just above the body of the base plate. An oil seal is preferably installed in the region between the outer diameter of the rotor shaft and the inner surface of the base plate aperture. The base plate and electric motor are then attached to the fluid containing gearbox or other device, preferably by means of a C-Face flange type of connection.

In use, the flinger rotates with the rotor shaft when the motor is in operation. In the event of oil seal failure in the gearbox, escaped oil flows downwardly along the rotor shaft or in close proximity thereto. The oil encounters the spinning flinger which projects the oil outwardly, away from the rotor shaft, and therefore away from the base plate aperture where the oil would possibly enter the inside of the motor. As the oil collects away from the motor opening, the oil escape ports facilitate the flow of the escaped oil away from the aperture area to the exterior of the interface.

The projection of leaking oil to the outside of the motor/gearbox assembly serves several functions. First and foremost, leaking oil is not given the opportunity to enter the underlying electric motor, preventing problems such as shorting, corrosion, and fire. Second, oil on the outside of the motor housing, or in another suitable holding means, is a clear indicator of malfunction, allowing otherwise undetectable seal leakage problems to be noted and repaired before equipment failure.

OBJECTS OF THE INVENTION

The principal object of the present invention is to provide an improved fluid drainage interface to prevent the accidental introduction of oil or other fluid into an electric motor when the electric motor is vertically mounted underneath fluid containing motor driven equipment.

A further object of this invention is to provide an improved fluid drainage interface to allow diagnosis of a fluid seal malfunction before failure of the fluid containing equipment or the connected electric motor.

Another object of the invention is to provide an improved fluid drainage interface to allow diagnosis of oil seal malfunction before failure of the oil containing equipment or the connected electric motor.

Another object of the invention is to provide an improved fluid drainage interface which may be connected to standard industrial electric motors and motor driven equipment using C-Face flanges, for use in an extremely wide variety of applications, and which may be produced at relatively low cost in small quantities.

BRIEF DESCRIPTION OF THE DRAWINGS

The foregoing and other objects will become more readily apparent by referring to the following detailed description and the appended drawings in which.

DETAILED DESCRIPTION

Figure 2:
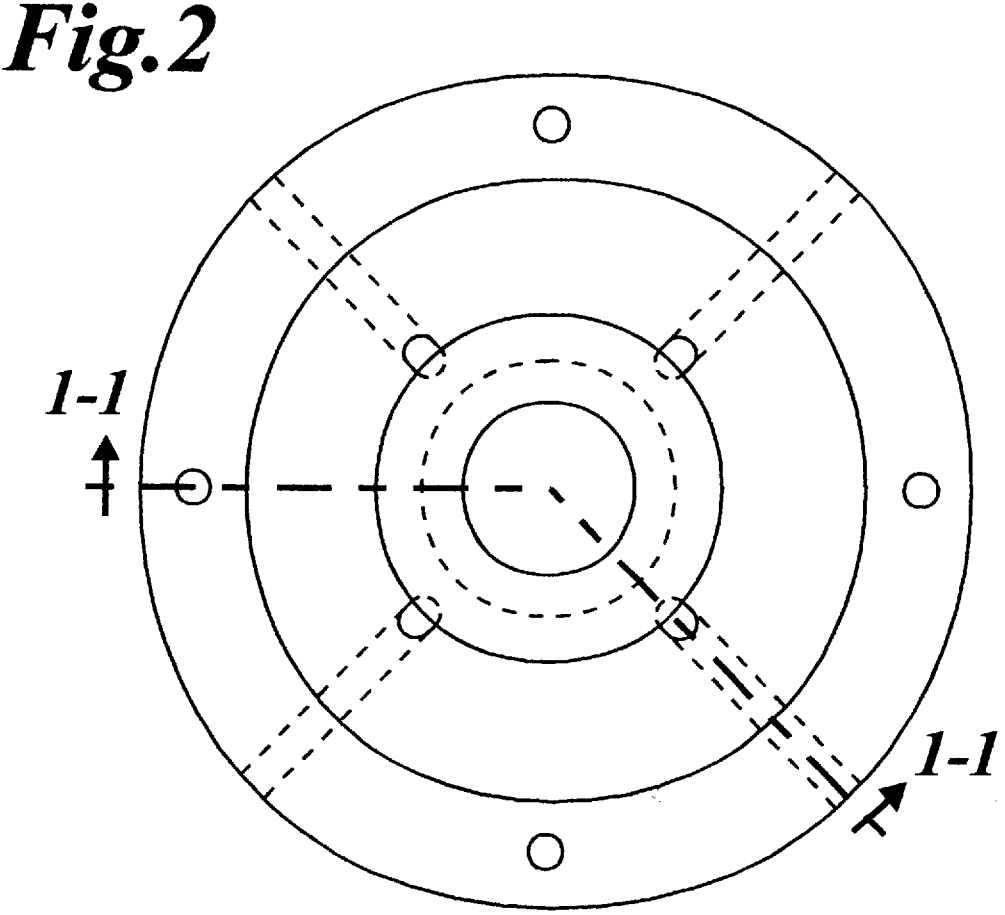
FIG. 2 is a top view of the invented drainage interface of FIG. 1.
Figure 1:
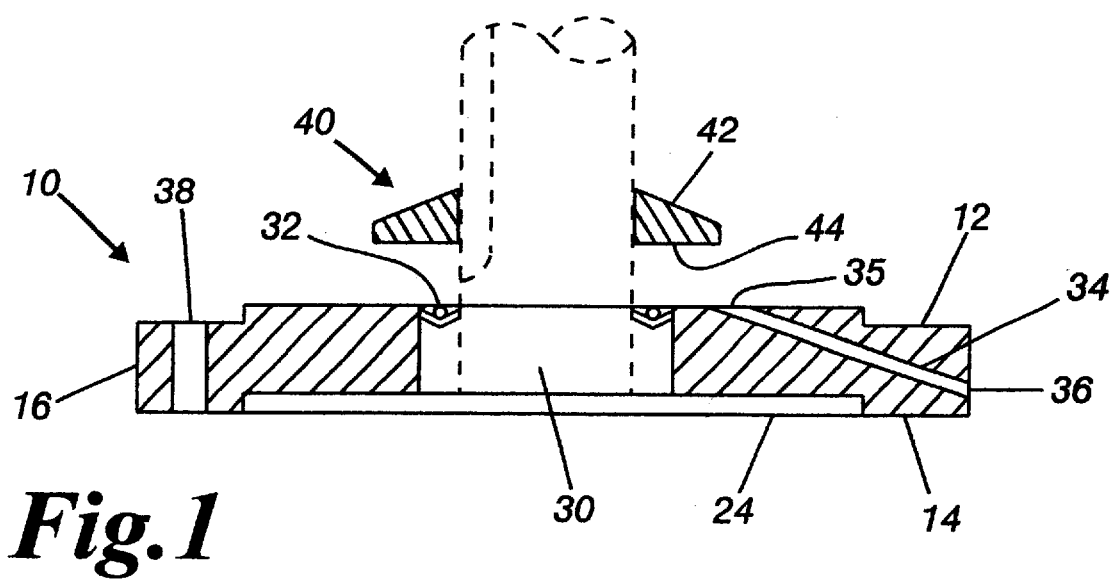
FIG. 1 is a cross-sectional view of the invented electric motor fluid drainage interface.

Referring now to the drawings, and particularly to FIGS. 1 and 2, the invented electric motor fluid drainage interface includes two parts: a base plate 10, and a smaller, circular flinger 40. When the invented interface is properly installed between an electric motor and a fluid containing motor driven device, the base plate 10 abuts and is attached to the endshield of the electric motor and the rotor shaft of the motor projects through the body of the base plate 10. The flinger 40 is then attached to the rotor shaft of the motor with the flinger 40 positioned above the surface of the base plate 10, opposite the motor endshield, and the interface is secured to the motor driven device.

The invented interface enables the connection of a vertically oriented electric motor underneath a variety of fluid containing, motor driven equipment. Most commonly, the motor driven equipment is a speed changing device such as a gearbox and the fluid contained therein is a lubricating oil, but the motor driven equipment may also include pumps, impellers, or any other apparatus requiring a vertically oriented motor, hereinafter collectively called "equipment".

The base plate 10 of the invented interface is a substantially circular disk having an upper surface 12, a lower surface 14, and an outer surface 16. The upper surface 12 and lower surface 14 of the base plate 10 are parallel to one another, while the outer surface 16, which defines the peripheral edge of the base plate 10, is perpendicular to both upper surface 12 and lower surface 14. The base plate 10 may be manufactured from any structurally sound material, but is preferably aluminum, machined steel, or cast iron.

A raised portion 20 projects upwardly from the upper surface 12 of base plate 10. The raised portion 20 serves the purpose of mating the invented interface with the equipment to which the interface and electric motor are connected. The raised portion 20 is circular, of uniform thickness, and is coaxial with the main body of the base plate 10, but raised portion 20 has a circumference less than that of the main body of base plate 10 such that a periphery of the upper surface 12 is not obscured by the raised portion 20.

The lower surface 14 of the base plate 10 is provided with a recess 24. The recess 24 serves the purpose of mating the invented interface with the endshield of the electric motor to which the interface and equipment are connected. The recess 24 is circular, of uniform depth, and is coaxial with the main body of the base plate 10, but has a circumference less than that of the main body of base plate 10 such that the periphery of the lower surface 14 is not included in the recess 24. The recess 24 has the same circumference as raised portion 20. In practice, the recess 24 is machined or formed with a plus tolerance, while raised portion 20 is machined with a minus tolerance.

A shaft aperture 30 is defined by and passes through the center of base plate 10 and raised portion 20. The shaft aperture 30 is cylindrical, with an axis perpendicular to the upper and lower surfaces 12,14. The circumference of the shaft aperture 30 will vary with motor size and rotor shaft size. An oil seal 32, as commonly known in the art, is preferably fitted within the shaft aperture 30. If the oil seal 32 is fitted within the shaft aperture 30, the aperture 30 will have sufficient diameter to house both the seal 32 and the rotor shaft.

The base plate 10 and raised portion 20 also define one or more oil exit ports 34. When installed, the invented interface isolates the area around the rotor shaft, the input shaft of the driven equipment, if any, and the oil seal of the driven equipment from the outside environment. The oil exit ports 34 allow leaking oil to escape from the inside of the interface to the outside environment.

The oil exit ports 34 are holes, defined by the invented interface, which extend through the base plate 10 and raised portion 20 of the interface, from the upper surface 12, somewhat diagonally, to the outer surface 16. The inlets 35 for the ports 34 are positioned on the upper surface of the raised portion 20 in the area between the shaft aperture 30 and the outer edge of the raised portion 20. The outlets 36 for the ports 34 are positioned on the outer surface 16, preferably as close to the lower surface 14 as mechanically practical. The exit ports 34 are positioned so that oil or other fluid entering the inlets 35 of the ports 34 will flow by gravity from the higher inlet 35 to the lower outlet 36.

The size, shape, or configuration of the oil exit ports 34 is not critical to the invention, as long as the ports 34 pass through the interface, from the upper surface of the raised portion to the outer surface 16 of the interface, and provide a pathway for the escaped oil to move away from the rotor shaft of the motor to the outside of the interface. It is preferred, as shown in FIG. 1 and FIG. 2, to have four cylindrical ports 34 evenly spaced about the base plate 10.

Bolt receiving holes 38 pass through and are defined by base plate 10. The holes 38, are spaced about the edges of base plate 10, passing from the upper surface 12, between the raised portion 20 and the outer edge of the base plate 10, to the lower surface 14, between the recess 24 and the outer edge of the base plate 10. The bolt holes may be of any size or configuration necessary to the application at hand. However, the bolt holes are preferably configured to correspond to a standard C-Face interface system. The C-Face system is standard in the art of electric motor installation, and allows the invented interface to be used with a wide variety of types and sizes of electric motors and motor driven equipment. The number and configuration of bolt holes is determined by standards promulgated by NEMA, the National Electrical Manufacturers Association. Multiple bolt hole 38 configurations may be used in a single base plate 10 so that a single interface may be used with several configurations of flanges and motors.

The flinger 40 is a circular ring having an outer diameter greater than the diameter of shaft aperture 30, but less than the diameter of raised portion 20, and having an inner diameter nominally the same as the diameter of the rotor shaft to which the flinger 40 is to be attached. The flinger 40 has an upper surface 42 and a lower surface 44. The lower surface 44 is substantially flat and rests parallel to the upper and lower surfaces 12,14 of the base plate 10 when installed with a base plate 10 around a common rotor shaft. The upper surface 42 is preferably angled downward, from the inner diameter to the outer diameter of the lower surface 44.

The flinger 40 is preferably manufactured from a polymer, and is most preferably manufactured from neoprene. The flinger 40 is simply installed upon the rotor shaft of the electric motor by sliding the flinger 40 down upon the rotor shaft before the motor is connected to the driven equipment.

In operation, the invented interface is mounted between an electric motor and a motor driven apparatus. The motor driven apparatus is most commonly a gear box, though the driven apparatus may be any of a number of mechanical devices requiring a vertically mounted motor because of space restrictions or design requirements. Such devices may include pumps, impellers, etc.

Though the invented interface may be attached to electric motors or gearboxes in any number of ways, the preferred method is by use of a C-Face standard attachment flanges. C-Face flanges are standardized attachment points, made uniform in size according to the size of the equipment being utilized, so that a range of sizes and configurations of equipment may be easily attached with one another. The instant invention may be manufactured in a variety of sizes corresponding to the different C-Face standards. In this manner, the flange formed by the periphery of base plate 10, with bolt holes 38, is easily positioned and secured between the threaded C-Face holes on the electric motor and the corresponding C-Face flange on the gearbox. Because the invented interface is attached to the C-Face flanges and connection points, it may be produced in uniform sizes and need not conform to the particular endshield shape or other specification of specific motor types or brands.

The base portion 10 is first connected to the electric motor, with the lower surface 14 of the base plate 10 abutting the endshield of the electric motor. This is accomplished by aligning the tapped holes of the electric motor with the corresponding bolt holes 38 of the base. The motor rotor shaft is then extended through the shaft aperture 30. The recess 24 receives a mating projection from the endshield of the attached motor, which causes the motor rotor shaft to be centered with and positioned coaxial to the with shaft aperture 30. Optional oil seal 32 is then installed or adjusted as needed. The oil seal 32 may be supplied as a component of the interface or may be applied separately.

The flinger 40 is installed by being attached around the rotor shaft of the motor, above the upper surface 12 of the base plate 10. The flinger 40 is installed by simply pressing it down along the rotor shaft. The flinger 40 is positioned just higher than, but is not connected to, raised portion 20.

The bolt holes 38 are aligned with corresponding bolt holes in the C-Face flange of the gearbox. Bolts are then inserted through the C-Face flange and interface holes and threaded into the drilled and tapped bolt receiving holes located in the electric motor endshield, so that the motor, interface, and gearbox are firmly bolted together, with the motor rotor shaft being connected to the shaft or other connection means of the gearbox. Once firmly connected, the motor output and rotor shaft section, the interface, and the gearbox input shaft section are all sealed from the outside environment except for the oil exit ports 34, which extend from the inside of the assembly, through the raised portion 20 and base plate 10, to the outside of the assembly.

When oil or other fluid escapes through the seal around the shaft of the motor driven equipment, the oil flows, by gravity, downward toward the rotor shaft end of the vertically mounted electric motor. As the oil descends toward the motor, the oil contacts the flinger 40, either directly or by streaming down the motor rotor shaft. Rotation of the rotor shaft and flinger 40 during normal motor usage causes the oil to be projected outwardly, away from the rotor shaft. If the motor is not in operation when the oil encounters the flinger 40, the oil will flow, by gravity, along the downwardly sloped upper surface 42 of the flinger 40 until the oil falls to the surface of the raised portion 20. In any event, the flinger 40 is positioned to overhang the gap between the inner diameter of the base plate 10 and the outer diameter of the rotor shaft, and any seal therein, so that oil is always projected or deposited away from the location of the rotor shaft, which prevents leaking oil from penetrating the motor oil seal and entering the motor.

Gravity and/or pressure buildup within the assembly causes the leaking oil, built up within the assembly and upon the surface of the raised portion 20, to flow through oil exit ports 34. The oil may be collected after escape from the assembly or may simply be allowed to flow along the outer case of the motor. The oil released through the oil ports 34 provides notice of oil seal failure upon routine inspection. If the oil is collected after escape, a gauge may be used to measure the rate of oil escape or the total amount of oil that has escaped from a piece of motor driven equipment.

FIRST ALTERNATIVE EMBODIMENT

A first alternative embodiment provides the invented interface with a slightly modified oil exit port 34 so that the invented interface may be used in the protection of horizontally mounted electric motors from accidental exposure to oil.

In this embodiment, the interface is attached to a horizontally mounted motor with at least one oil exit port 34 facing downward. Since any of the cumulative escaped oil will pass through the single downward facing port 34, only one such port 34 is needed, and therefore only one such port 34 is preferred. Further, the oil port inlet 35 is preferably positioned as close to the edge of the raised portion 20 as is mechanically practical, such that escaped oil is not allowed to accumulate in the space between the inlet 35 and the outer edge of the raised portion 20.

SECOND ALTERNATIVE EMBODIMENT

Figure 4:
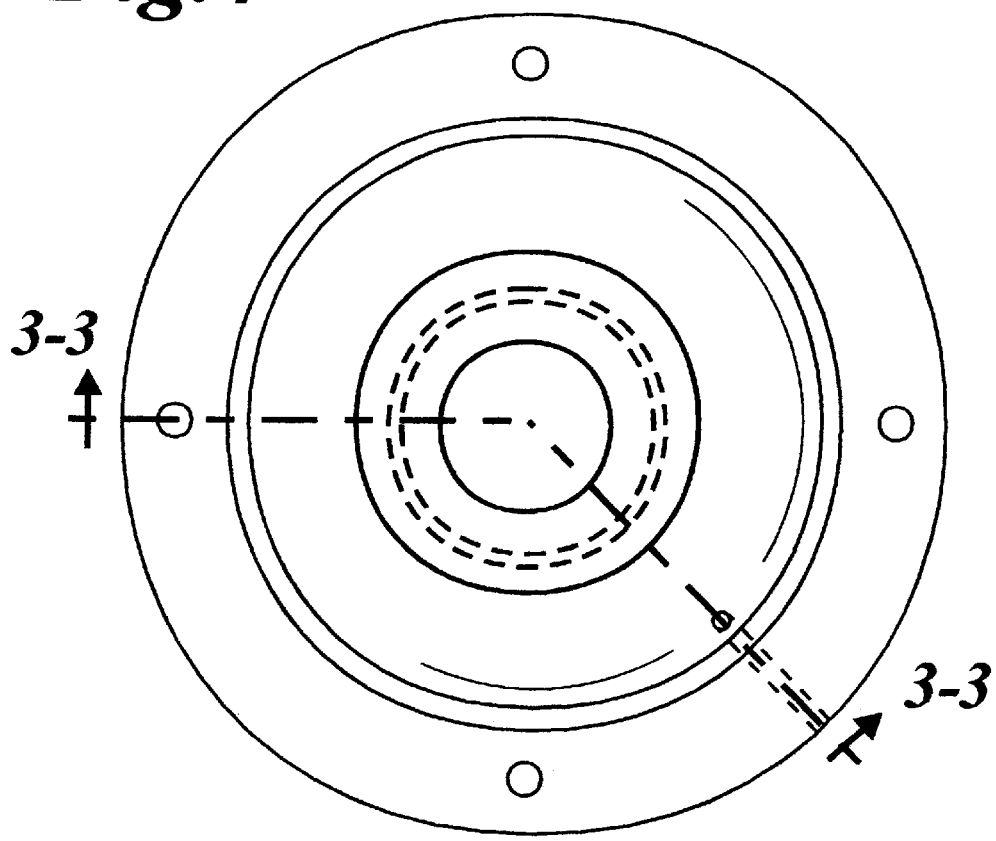
FIG. 4 is a top view of an alternative embodiment of the invented drainage interface shown in FIG. 3.
Figure 3:
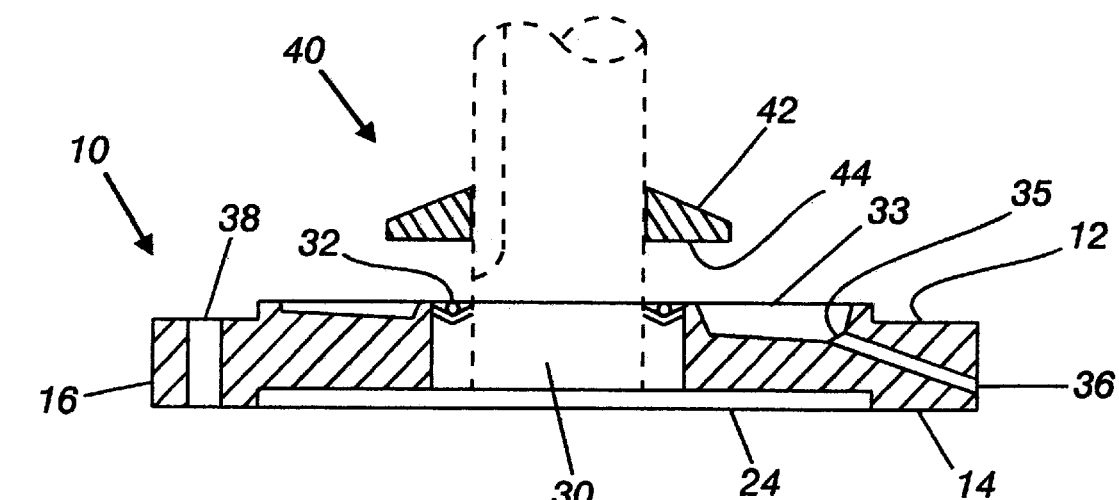
FIG. 3 is a cross-sectional view of an alternative embodiment of the invented electric motor fluid drainage interface.

Referring now to FIGS. 3 and 4, a second alternative embodiment has a base plate 10 and a raised portion 20 defining an oil reservoir 33 combined with a single oil exit port 34, rather than a plurality of oil exit ports 34. The reservoir 33 is a depression, having varying depth, formed on the top surface 12 of the interface. The reservoir 33 has an inner ridge 52 and an outer ridge 54, with the inner ridge 52 being a raised lip surrounding shaft aperture 30 and the outer ridge 54 being a raised lip formed by the outer edge of raised portion 20.

The oil reservoir 33 has varying depth, with the area of slightest depth located farthest away from the oil exit port 34. Depth of the oil reservoir 33 gradually increases in those areas closer to the port 34, with maximum depth of the reservoir 34 corresponding to the location of the port 34. The oil exit port 34 is substantially the same as the oil exit port 34 described in the detailed description except that the inlet 35 will necessarily be found on the bottom surface of the reservoir 33 rather than the upper surface of raised portion 20.

In operation, oil escaping from the driven equipment flows down the rotor shaft of the motor or falls directly upon the flinger 40. Rotation of the rotor shaft and flinger 40 during normal motor usage causes the oil to be projected outwardly, away from the rotor shaft. The oil then flows downward, by gravity, into the oil collection reservoir 50. If the motor is not in operation when the oil encounters the flinger 40, the oil will flow, by gravity, along the downwardly sloped upper surface 42 of the flinger 40 until the oil drops into the reservoir 50. The oil flows, by gravity, from the area of the reservoir 50 having the slightest depth to the area of the reservoir having the greatest depth. The inner ridge 52 prohibits the escaped oil from encountering the oil seal 32, lessening the possibility of oil gaining entry into the protected motor. The outer ridge 54 prevents escaped oil from resting at the junction of the interface with the driven equipment, and serves to direct the oil downwardly into the reservoir 50. The oil exit port 34 allows oil to escape from the lowest point of reservoir 50 to the outside of the interface.

EXAMPLES

The invented interface may be manufactured to size specifications for use with any industrially applicable electric motor and motor driven device. However, most industrial applications utilize motor attachment means of standard size and shape. Of most significant note, C-Face flanges are a series of standardized flanges having a variety of sizes capable of mating electric motors with a wide range of motor driven equipment. The invented interface is specially suited for use with the C-Face flanges since the interface may by mounted directly upon a C-Face compatible motor and then directly mounted up into the C-Face compatible flange on industrial motor driven equipment.

By way of example, and not by way of limitation, sample interface dimensions as promulgated by the National Electrical Manufacturers Association (NEMA) are shown below. Standardized sizes:

TABLE 1

| Frame | Shaft | Bolt Circle - AJ | OD BD - MAX | Pilot DIA - AK | Ext BB | Hole DIA BF |
|---|---|---|---|---|---|---|
| 56 C | 0.625 | 5.875 | 6.5 | 4.500 | 0.13 | 7/16 (3/8-16) |
| 143/5TC | 0.875 | 5.875 | 6.5 | 4.500 | 0.13 | 7/16 (3/8-16) |
| 182/4TC | 1.125 | 7.25 | 9.0 | 8.500 | 0.25 | 9/16 (1/2-13) |
| 213/5TC | 1.375 | 7.25 | 9.0 | 8.500 | 0.25 | 9/16 (1/2-13) |
| 254/6TC | 1.625 | 7.25 | 10.0 | 8.500 | 0.25 | 9/16 (1/2-13) |
| 284/6TC | 1.875 | 9.00 | 11.25 | 10.500 | 0.25 | 9/16 (1/2-13) |
| 324/6TC | 2.125 | 11.00 | 14.00 | 12.500 | 0.25 | 11/16 (5/8-11) |
| 364/5TC | 2.375 | 11.00 | 14.00 | 12.500 | 0.25 | 11/16 (5/8-11) |

"Frame" = frame designation
"Shaft" = diameter of motor shaft (in.)
"Bolt Circle - AJ" = diameter of circle along which bolt holes are tapped in a motor (in.)
"OD BD - Max" = maximum outer diameter of the base plate (in.)
"Pilot DIA - AK" = nominal diameter of recess and raised portion (in.)
"Ext BB" = nominal raised amount and nominal recessed amount of recess and raised portion (in.)
"Hole DIA BF" = hole diameter and drill/tap size of holes in motor (in.)

Corresponding dimensions for sample interfaces:

TABLE 2

| Frame | BB | T | OD | ID | Width - Max |
|---|---|---|---|---|---|
| 56c | 0.13 | 0.500 | 6.50 | 0.625 | 0.370 |
| 143/STC | 0.13 | 0.500 | 6.50 | 0.875 | 0.370 |
| 182/4TC | 0.25 | 0.750 | 9.00 | 1.125 | 0.500 |
| 213/5TC | 0.25 | 0.750 | 9.00 | 1.375 | 0.500 |
| 254/6TC | 0.25 | 0.750 | 9.00 | 1.625 | 0.500 |
| 284/6TC | 0.25 | 0.750 | 11.25 | 1.875 | 0.500 |

TABLE 2-continued

| Frame | BB | T | OD | ID | Width - Max |
|---|---|---|---|---|---|
| 324/6TC | 0.25 | 0.750 | 12.50 | 2.125 | 0.500 |
| 364/5TC | 0.25 | 0.750 | 12.50 | 2.375 | 0.500 |

"BB" = thickness of raised portion 20 (in.) = thickness of recess 25 (in.)
"T" = thickness of base plate 10, without raised portion 20 (in.)
"OD" = outer diameter of base plate 10 (in.)
"ID" = inner diameter of base plate 10, with oil seal (in.) = nominal dimensions of rotor shaft (in.)
"Width - Max" = Maximum width of base plate 10

SUMMARY OF THE ACHIEVEMENT OF THE OBJECTS OF THE INVENTION

From the foregoing, it is readily apparent that I have invented an improved fluid drainage interface to prevent the accidental introduction of oil or other fluid into an electric motor when the electric motor is vertically mounted underneath fluid containing motor driven equipment, which allows diagnosis of a fluid seal malfunction before failure of the fluid containing equipment or the connected electric motor, which allows diagnosis of oil seal malfunction before failure of the oil containing equipment or the connected electric motor, which may be connected to standard industrial electric motors and motor driven equipment using C-Face flanges, for use in an extremely wide variety of applications, and which may be produced at relatively low cost in small quantities.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An improved electric motor fluid drainage interface for placement between an electric motor and an item of motor driven equipment which prevents the accidental leakage of fluid from said equipment into said electric motor, said interface comprising:

a base plate, attachable to said electric motor and said motor driven equipment, comprising
a main body having an upper, lower, and outer surface, said upper and lower surfaces being parallel to one another;
said main body having a circular raised portion projecting upwardly from said upper surface of said main body, and a circular recess defined within said lower surface of said main body, said recess having the same nominal diameter as said raised portion, said recess having the same nominal thickness as said raised portion, and said recess being coaxial with said raised portion;
a shaft aperture defined by said main body which passes through said main body in the direction perpendicular to the planes of said upper and lower surfaces, and co-axial with said raised portion and said recess;
at least one oil exit port defined by said main body which passes through said main body extending from said upper surface of said raised portion to said outer surface; and,
at least one bolt receiving aperture defined by and passing through said main body from said upper surface to said lower surface; and,
a ring shaped flinger, attachable to the rotor shaft of said electric motor.

2. The improved drainage interface of claim 1, wherein said main body is circular and is coaxial with said raised portion and said recess.

3. The improved drainage interface of claim 1, wherein said shaft aperture is cylindrical.

4. The improved drainage interface of claim 3, further comprising an oil seal disposed within said shaft aperture.

5. The improved drainage interface of claim 3, wherein said flinger has an inner diameter and an outer diameter, said outer diameter being greater than the diameter of said cylindrical shaft aperture.

6. The improved drainage interface of claim 5, wherein said flinger has a top surface which angles downward from said inner diameter to said outer diameter.

7. The improved drainage interface of claim 1, wherein said flinger is constructed of a slightly elastic material.

8. The improved drainage interface of claim 7, wherein said flinger is constructed of neoprene.

9. The improved drainage interface of claim 1, wherein said base plate is constructed from a material selected from the group consisting of: aluminum, steel, and iron.

10. The improved drainage interface of claim 1, wherein said raised portion is manufactured with a negative manufacturing tolerance; and,
wherein said recess is manufactured with a positive manufacturing tolerance.

11. The improved drainage interface of claim 1, wherein said oil exit ports are cylindrical.

12. The improved drainage interface of claim 1, wherein said at least one bolt receiving aperture is a plurality of unthreaded holes.

13. The improved drainage interface of claim 12, wherein said plurality of holes are four in number.

14. The improved drainage interface of claim 12, wherein said plurality of holes are eight in number.

15. The improved drainage interface of claim 1, further comprising:
an oil reservoir of varying depth defined within said upper surface of said raised portion, wherein said oil reservoir encircles said shaft aperture, said oil reservoir is bounded by the outer edge of said raised portion and the inner edge of said raised portion, and the depth of said reservoir increases gradually from a minimum depth region to a maximum depth region.

16. The improved drainage interface of claim 15, wherein said at least one oil exit port extends from said maximum depth region to said outer surface.

\* \* \* \* \*